(12) United States Patent
Drakoulis et al.

(10) Patent No.: US 7,647,613 B2
(45) Date of Patent: Jan. 12, 2010

(54) APPARATUS AND METHOD FOR INTERACTIVE CONTENT REQUESTS IN A NETWORKED COMPUTER JUKEBOX

(75) Inventors: Niko Drakoulis, Arlington Heights, IL (US); John Karantonis, Chicago, IL (US); Georgios Stoikos, Serres (GR)

(73) Assignee: Akoo International, Inc., Elmwood Park, IL (US)

( * ) Notice: Subject to any disclaimer, the term of this patent is extended or adjusted under 35 U.S.C. 154(b) by 180 days.

(21) Appl. No.: 11/186,572

(22) Filed: Jul. 21, 2005

(65) Prior Publication Data

US 2006/0018209 A1    Jan. 26, 2006

Related U.S. Application Data

(60) Provisional application No. 60/590,120, filed on Jul. 22, 2004.

(51) Int. Cl.
*H04N 7/173* (2006.01)

(52) U.S. Cl. .............................. 725/87; 725/91; 725/98; 725/103

(58) Field of Classification Search ........................ None
See application file for complete search history.

(56) References Cited

U.S. PATENT DOCUMENTS

| | | |
|---|---|---|
| 4,414,467 A | 11/1983 | Gould et al. |
| 4,528,643 A | 7/1985 | Freeny, Jr. |
| 4,553,211 A | 11/1985 | Kawasaki et al. |
| 4,905,280 A | 2/1990 | Wiedemer |
| 5,150,817 A | 9/1992 | Livingston |
| 5,219,094 A | 6/1993 | Labriola |
| 5,291,554 A | 3/1994 | Morales |
| 5,323,448 A | 6/1994 | Biggs |
| 5,339,250 A | 8/1994 | Durbin |
| 5,355,302 A | 10/1994 | Martin et al. |
| 5,415,319 A | 5/1995 | Risolia |
| 5,440,336 A | 8/1995 | Buhro et al. |
| 5,445,295 A | 8/1995 | Brown |
| 5,475,740 A | 12/1995 | Biggs, Jr. et al. |

(Continued)

FOREIGN PATENT DOCUMENTS

EP    1370023 A1    10/2003

(Continued)

OTHER PUBLICATIONS

International Search Report dated Jun. 16, 2006.

(Continued)

*Primary Examiner*—Christopher Grant
*Assistant Examiner*—Mushfikh Alam
(74) *Attorney, Agent, or Firm*—Young, Basile, Hanlon & MacFarlane, P.C.

(57) ABSTRACT

A remote user interface transmits a digital media request through a communication link to a control which is coupled to a digital audio-visual playback device for selecting and playing a stored digital media by the playback device. The control receives the digital media request and transmits digital media selection and/or the selected digital media content directly to a selected playback device or indirectly to the selected playback device through a playback device server. The communication between the control and the playback device can be through a global communication network.

25 Claims, 7 Drawing Sheets

U.S. PATENT DOCUMENTS

| | | | |
|---|---|---|---|
| 5,481,509 A | 1/1996 | Knowles | |
| 5,519,435 A | 5/1996 | Anderson | |
| 5,521,631 A | 5/1996 | Budow | |
| 5,528,282 A | 6/1996 | Voeten et al. | |
| 5,629,867 A | 5/1997 | Goldman | |
| 5,633,839 A | 5/1997 | Alexander et al. | |
| 5,641,319 A | 6/1997 | Stoel et al. | |
| 5,644,714 A | 7/1997 | Kikinis | |
| 5,647,505 A | 7/1997 | Scott | |
| 5,661,517 A | 8/1997 | Budow et al. | |
| 5,675,738 A * | 10/1997 | Suzuki et al. | 709/219 |
| 5,745,556 A | 4/1998 | Ronen | |
| 5,748,485 A | 5/1998 | Christiansen et al. | |
| 5,769,269 A | 6/1998 | Peters | |
| 5,781,889 A | 7/1998 | Martin et al. | |
| 5,794,217 A | 8/1998 | Allen | |
| 5,798,785 A | 8/1998 | Hendricks et al. | |
| 5,809,246 A | 9/1998 | Goldman | |
| 5,831,862 A | 11/1998 | Hetrick et al. | |
| 5,848,398 A | 12/1998 | Martin et al. | |
| 5,911,043 A | 6/1999 | Duffy et al. | |
| 5,914,712 A | 6/1999 | Sartain et al. | |
| 5,930,765 A | 7/1999 | Martin | |
| 5,945,987 A | 8/1999 | Dunn | |
| 5,959,945 A | 9/1999 | Kleiman | |
| 5,999,207 A | 12/1999 | Rodriguez et al. | |
| 6,067,562 A | 5/2000 | Goldman | |
| 6,163,795 A | 12/2000 | Kikinis | |
| 6,172,948 B1 | 1/2001 | Keller et al. | |
| 6,232,539 B1 | 5/2001 | Looney et al. | |
| 6,248,946 B1 | 6/2001 | Dwek | |
| 6,269,394 B1 | 7/2001 | Kenner et al. | |
| 6,295,555 B1 | 9/2001 | Goldman | |
| 6,381,575 B1 | 4/2002 | Martin et al. | |
| 6,392,664 B1 | 5/2002 | White et al. | |
| 6,397,189 B1 | 5/2002 | Martin et al. | |
| 6,507,727 B1 * | 1/2003 | Henrick | 455/3.06 |
| 6,587,403 B1 | 7/2003 | Keller et al. | |
| 6,598,230 B1 * | 7/2003 | Ballhorn | 725/118 |
| 6,611,654 B1 | 8/2003 | Shteyn | 386/83 |
| 6,628,302 B2 | 9/2003 | White et al. | |
| 6,647,417 B1 | 11/2003 | Hunter et al. | |
| 6,876,901 B2 | 4/2005 | DiLorenzo | |
| 7,143,430 B1 | 11/2006 | Fingerman et al. | |
| 7,430,554 B1 | 9/2008 | Heisinger, Jr. | |
| 2001/0023403 A1 | 9/2001 | Martin et al. | |
| 2001/0039659 A1 | 11/2001 | Simmons et al. | |
| 2001/0053996 A1 | 12/2001 | Atkinson | |
| 2002/0026500 A1 | 2/2002 | Kanefsky et al. | |
| 2002/0032752 A1 | 3/2002 | Gold et al. | |
| 2002/0049717 A1 | 4/2002 | Routtenberg et al. | |
| 2002/0093921 A1 | 7/2002 | Urs et al. | |
| 2002/0113824 A1 | 8/2002 | Myers, Jr. | |
| 2002/0119793 A1 | 8/2002 | Hronek et al. | |
| 2002/0133562 A1 | 9/2002 | Newnam et al. | |
| 2002/0147658 A1 | 10/2002 | Kwan | |
| 2002/0156896 A1 | 10/2002 | Lin et al. | |
| 2002/0194264 A1 * | 12/2002 | Uchiyama et al. | 709/203 |
| 2003/0050058 A1 | 3/2003 | Walsh et al. | 455/426 |
| 2003/0056222 A1 | 3/2003 | Iwata et al. | |
| 2003/0074219 A1 | 4/2003 | Martin et al. | |
| 2003/0100321 A1 | 5/2003 | Roa et al. | |
| 2003/0132952 A1 | 7/2003 | Davis et al. | |
| 2003/0135424 A1 | 7/2003 | Davis et al. | |
| 2003/0139980 A1 | 7/2003 | Hamilton | |
| 2003/0172132 A1 | 9/2003 | Lin et al. | |
| 2003/0193519 A1 | 10/2003 | Hayes et al. | |
| 2004/0001396 A1 | 1/2004 | Keller et al. | |
| 2004/0010800 A1 | 1/2004 | Goci | |
| 2004/0015995 A1 * | 1/2004 | Shao et al. | 725/87 |
| 2004/0025185 A1 | 2/2004 | Goci et al. | |
| 2004/0028195 A1 | 2/2004 | Leyden et al. | |
| 2004/0029598 A1 | 2/2004 | Guggisberg | |
| 2004/0030906 A1 | 2/2004 | Marmigere et al. | |
| 2004/0030930 A1 | 2/2004 | Nomura | |
| 2004/0038691 A1 | 2/2004 | Shin | |
| 2004/0039782 A1 | 2/2004 | Reddy et al. | |
| 2004/0048628 A1 | 3/2004 | Puccioni | |
| 2004/0111749 A1 * | 6/2004 | Zhang et al. | 725/87 |
| 2004/0158871 A1 | 8/2004 | Jacobson | |
| 2004/0205171 A1 | 10/2004 | Nathan et al. | |
| 2004/0218047 A1 | 11/2004 | Goodman et al. | |
| 2004/0243482 A1 | 12/2004 | Laut | |
| 2005/0021418 A1 | 1/2005 | Marcus et al. | |
| 2005/0021421 A1 | 1/2005 | Herman | |
| 2005/0022127 A1 | 1/2005 | Meyers et al. | |
| 2005/0022244 A1 | 1/2005 | Scheelke | |
| 2005/0028197 A1 | 2/2005 | White et al. | |
| 2005/0044254 A1 * | 2/2005 | Smith | 709/231 |
| 2005/0044568 A1 | 2/2005 | White et al. | |
| 2005/0055716 A1 | 3/2005 | Louie et al. | 725/58 |
| 2005/0057538 A1 | 3/2005 | Morse et al. | |
| 2005/0060405 A1 | 3/2005 | Nathan et al. | |
| 2005/0071881 A1 * | 3/2005 | Deshpande | 725/88 |
| 2005/0076376 A1 | 4/2005 | Lind | |
| 2005/0076388 A1 | 4/2005 | Morse et al. | |
| 2005/0091107 A1 | 4/2005 | Blum | |
| 2005/0097619 A1 | 5/2005 | Haddad | |
| 2005/0125833 A1 | 6/2005 | Nathan et al. | |
| 2005/0132405 A1 | 6/2005 | AbiEzzi et al. | |
| 2005/0177853 A1 | 8/2005 | Williams et al. | |
| 2005/0278766 A1 | 12/2005 | Benco et al. | |
| 2006/0085821 A9 | 4/2006 | Simmons et al. | |
| 2006/0107286 A1 | 5/2006 | Connor et al. | |
| 2006/0184979 A1 | 8/2006 | Bayrakeri et al. | |
| 2006/0225097 A1 | 10/2006 | Lawrence-Apfelbaum | |
| 2007/0094698 A1 | 4/2007 | Bountour et al. | |

FOREIGN PATENT DOCUMENTS

| | | |
|---|---|---|
| WO | 9922346 | 5/1999 |
| WO | 0128222 | 4/2001 |
| WO | 0139577 | 6/2001 |
| WO | 03/050058 A1 | 3/2003 |

OTHER PUBLICATIONS

Written Opinion of International Searching Authority dated Jun. 16, 2006.

Chinese Patent Office Action Application No. 200580030849.2 Dated Jan. 23, 2009. Applicant is citing the Chinese Patent Office Action and the new reference to Walsh cited therein.

European Search Report Dated Jun. 9, 2009; claiming priority from Application No. 05764482.5-1241/1776834 PCT/US2005025749.

European Patent Office Communication pursuant to Article 94(3) EPC dated Sep. 9, 2009.

* cited by examiner

APPARATUS AND METHOD FOR INTERACTIVE CONTENT REQUESTS IN A NETWORKED COMPUTER JUKEBOX

CROSS-REFERENCE TO RELATED APPLICATIONS

This Application claims the benefit of the filing date of U.S. Provisional Patent Application Ser. No. 60/590,120 filed Jul. 22, 2004, the contents of which are incorporated herein in its entirety.

BACKGROUND

The present invention relates, in general, to jukeboxes, specifically, to jukebox central management systems formed of networked jukeboxes and, more particularly, to selection of specific content or media for output by a jukebox.

The jukebox industry has existed since 1887 when saloon owner Charlie Glass invented the "Nickel in the Slot," giving birth to the amusements industry and spurring the development of the recording industry. This event can also be considered an early inception point of "micro-payment" business models in exchange for a unique service to consumers.

The jukebox industry is now entering its third boom both economically and technologically. The advent of enterprise network jukebox products has made system monitoring, content updates and service management more cost-effective relative to conventional jukebox operations. In addition, sensor and software-based user interface technology has enhanced artist, album and song search features for consumers, providing the ability to browse an unlimited number of content selections via a rich media digital touch-screen.

Digital jukeboxes have recently been developed in order to provide a greater selection of music content relative to conventional CD jukeboxes. The advent of networked digital jukebox systems has enabled options to incorporate hard-disk storage capacity in pay-for-play amusement devices, provide a more efficient means of updating music on a communications network of amusement devices and systematically reduce on-site technician visits. Network digital jukeboxes employ a client server software system that takes advantage of digital technology and the Internet to provide patrons with next generation features and to provide jukebox operators with the ability to centrally manage their jukeboxes via a web portal. The onsite store of media in each jukebox may be periodically revised with new digital media transmitted by the jukebox network server. As a result, network operators can remotely update content, retrieve usage and revenue information, change pricing or play configurations, and check jukebox health statistics.

Similarly, this technology provides patrons with access to content and songs either stored on a local hard-disk or available for download from centralized and/or remote library mechanisms in order to playback the output on the local jukebox.

Nevertheless, several features have carried forward from the earliest machines. One of these features includes the requirement to browse through a selection of songs and select one for play by physically affecting a catalog mechanism located exactly on, and/or inside the jukebox amusement device. A central feature of modern jukeboxes involves sensor and software-based user interface technology located exactly on, and/or inside the jukebox amusement device. This technology has enhanced artist, album and song selection features for consumers, providing the ability to browse a virtually unlimited number of catalog selections via a digital touch-screen. A monetary acceptance device for currency, credit card, or pre-paid billing card, etc., is employed to validate any jukebox request made from a modern touch-screen machine. The request is acted on by the jukebox if the selected media is stored in the jukebox. If not, the request is transmitted from the jukebox to the jukebox network server wherein the music, video or other digital selection is transmitted back to the particular jukebox.

Despite such industry improvements, critical management and relevant usage problems associated with both conventional as well as digital systems have remained unresolved. Furthermore, networked touch-screen jukebox products featuring comprehensive selection and content capacity have spawned potentially adverse economy-of-scale effects for network operators.

Location-based Jukebox song selection is not yet as efficient, concurrently interactive, or personally compelling as it "should" be to address today's competitive realities. A critical usage problem related to conventional systems—and exponentially more vexing of networked digital jukebox products—is that these systems require users to browse, select and order music content in a linear fashion or "one person at a time," thereby limiting the maximum volume of transactions and potentially increasing "dwell" time per user at each jukebox location. Current system designs remain constrained to physical kiosk products coupled to a linear selection and payment-acceptance (i.e. coin) mechanism at the point-of-purchase. The customer must first move within exact proximity of the kiosk, directly face the jukebox interface, input the desired content selection and directly affect payment into the unit to activate the order. In addition, usage data cannot be mined for demographic information and no direct communication channel currently exists for personalized service models or the cross-marketing of related digital products to consumers (i.e. "over-the-air" downloads, targeted promotions or ads).

In the case of networked digital systems, the above described inverse relationships are negatively exacerbated precisely because; i) current product designs have retained the requirement for exact user proximity to the amusement output device even though the user may not always place a song order when browsing current content catalogs, ii) current product designs have increased the search, selection features and catalog capacity available to users, iii) current product designs force "single-user" linear access to the available catalog even though time-to-order is an unpredictable variable across users, iv) current product designs do not harness efficient content ingestion, location updating and on-demand downloading architectures, v) current product designs require installation of multiple kiosk selection devices for multi-zoned entertainment venues, and vi) the selection and output methods are coupled to the enabling payment system (s). This system design paradox potentially creates adverse economic costs for digital network operators who purchase jukebox hardware, license content catalogs, develop distribution relationships, share substantial revenue streams with manufacturers and venue partners, manage coin-collection routes, maintain a large number of devices and manage commercial implementation of critical system and network elements. Furthermore, high costs associated with the production/assembly process of electronic jukebox amusement devices and the total cost of ownership for operators has sapped economies of scale, reduced mass adoption and contributed to the subsequent fragmentation of the industry.

Current industry solutions partially address the limiting usage and operational factors described above by creating enhanced or additional features. Such features include touchscreen browsing and search functionality, credit card payment or priority play mechanisms to entice customer orders and increase revenue opportunities. Although such features offer new options for consumers who can place their order ahead of previous content orders at a price premium, they do not resolve the loss of sales and diminishing returns from linear kiosk usage in general.

Thus, it would be desirable to provide an easier method for selection content or media on a local jukebox. It would also be desirable to provide a local jukebox with a non-linear user content selection capability. It would be desirable to provide a method and apparatus that will allow a plurality of users to access the services offered by the jukebox concurrently. It would be desirable to eliminate the necessity for users to move to the jukebox and make their selection at the computer jukebox. Finally, it would be desirable to provide a method of placing a digital content play request to a computer jukebox or a plurality of computer jukeboxes remotely by using another device.

SUMMARY

There is disclosed an apparatus and method for interactive content requests in a networked digital audio-visual playback system or computer jukebox which enables user requests for selecting a specific digital media playback at a specified playback device location to be implemented wirelessly by the user.

In one aspect, the apparatus provides for content selection in a digital audio-visual playback device capable of playing digital audio-visual media, a control means coupled in data communication with the digital audio-visual playback device for controlling at least one of a digital media transfer to the digital audio-visual playback device and a digital media selection in the digital audio-visual playback device, a communication link and a, user interface for transmitting a digital media request selecting a digital media for play by a selected digital audio-visual playback device.

In another aspect, a method for content selection in a networked digital audio-visual playback device comprises the steps of:
    storing digital media in a memory;
    generating a digital media content request by a user interface remote from a digital audio-visual playback device identifying a digital audio-visual playback device and a selected stored digital media for play by the identified digital audio-visual playback device;
    transmitting the digital media content request through a communication link to a control; and
    transmitting the identified digital media by the control to the digital audio-visual playback device for play of the identified digital media by the digital audio-visual playback device.

The present interactive content request apparatus and method uniquely enables digital media for play through a digital audio playback device, such as a digital jukebox, to be remotely and wirelessly selected by a user. This eliminates the need for the user to move to the location of the jukebox and input a selection via the normal keyboard, mouse, and/or touchscreen display provided with prior jukeboxes. The apparatus and method also enables the user to remotely browse the available digital media content remotely from the jukebox. This can eliminate the expense of providing a display device or monitor along with the keyboard, mouse, and touchscreen inputs since the entire digital media selection process can be done remotely and wirelessly through an interface user.

The apparatus and method also provide automatic billing for each user request via any of multiple payment methods in a manner transparent to the user at the time of making a request. This eliminates the need to provide each physical digital jukebox with the monetary receiving and validation mechanism for payment of each selection.

BRIEF DESCRIPTION OF THE DRAWING

The various features, advantages and other uses of the present invention will become more apparent by referring to the following detailed description and drawing in which.

DETAILED DESCRIPTION

The present invention provides an interactive jukebox request system in a communication network for selecting content events and/or songs for output by a local digital audio-visual playback device, such as a digital computer jukebox from a mobile communication device.

The term "audio-visual" as referred to herein to encompass audio data, such as music, spoken words, etc., visual data, such as movies, video games, and other visual images, including text, and combinations of audio and visual material simultaneously output to an audio-visual playback device. Thus, it will be understood that although music and music identification data are referred to hereafter, it will be understood that this is by way of example only.

Further, it will be understood that the use of the term digital media will encompass both audio and/or visual data as well as audio and/or visual data identification, such as author name, title, length of play, type of media, etc.

Further, any digital audio-visual playback device may be employed. It will be understood that the following description of one such device as being a digital computer jukebox is also by way of example.

Figure 1:
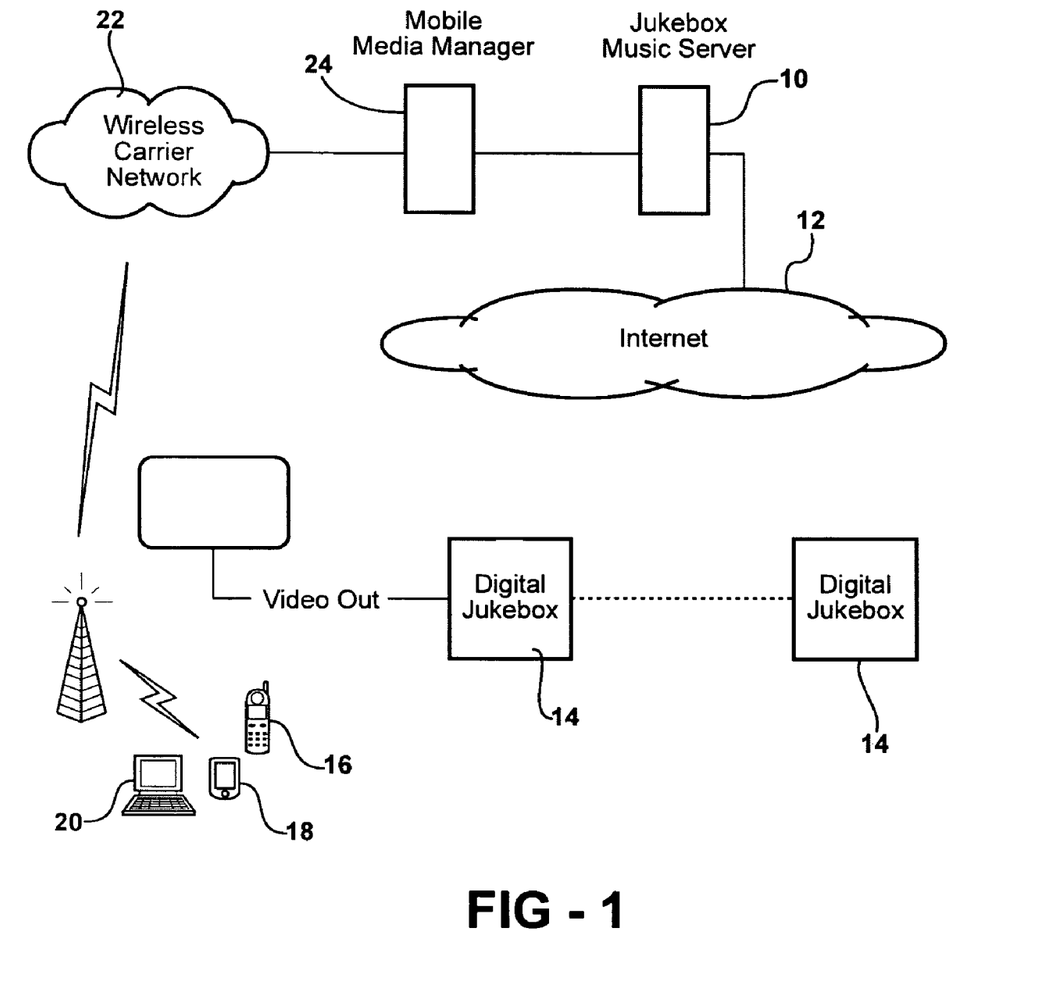
FIGS. 1-5 are block diagrams of different aspects of the present digital media content request apparatus.

In one aspect shown in FIG. 1, a central management system manages a communication link to mobile stations in a computer jukebox network and translates packets in the payloads of SMS, MMS or Internet messages containing specific content selections created by a mobile user located remote from a jukebox. A central Mobile MEDIA MANAGER (MMM) 24 implemented as a feature of communication link 22, such as a carrier network, which may be implemented as a Short-Message-Service-Center (SMSC) 22 and Mobile-Multimedia-Service-Environment (MMSE) or an Internet network, manages concurrent mobile-originating transmissions representing mobile user selected content or media, such as song selections, designated for public performance from one of a plurality of computer jukeboxes 14.

At least a portion of the carrier network 22 may include wireless communication. The central MMM 24 addresses a host jukebox network server via HTTP, for example, that maintains a master set of compressed digital data or media representing a plurality of songs, song associated graphics, song identity information, and jukebox venue location identification codes, for example. The MMM 24 receives mobile selection information from the carrier network 22 and polls the jukebox network server 10 connected to a plurality of digital jukeboxes 14 and capable of storing a subset of the master set of digital media to obtain an updated list of registered jukeboxes 14, to determine content availability from a list of content or music residing on the jukebox network server 10 and/or the jukeboxes 14, and to check the validity of the user request.

Specific content selections initiated by a mobile user 16, 18, 20 including content event or song identity, venue location register and service priority queuing to a specific computer jukebox apparatus 14, received at the central MMM 24 to provide audio or video output in the service, venue or jukebox 14 where the mobile user initiated the selection. The MMM 24 interfacing the carrier network 22 and the jukebox network server 10 operates on a scheduled peer session interval to authenticate users, determine the value of the billing event and handle submission of jukebox 14 requests. The MMM 24 differentiates the value of the jukebox network carrier requests to the billing entity. The MMM 24 communicates to the core network carrier 22 whether a mobile user, i.e., wireless carrier, SMSC, etc., should be billed only after the MMM 24 has verified that a corresponding jukebox 14 is operating, the MMM 24 has verified that the master or the subset of the master set of digital media is available, and the MMM 24 has forwarded the user request designated as a "standard" or "priority" request to be placed in the jukebox network server 10 queue.

In FIG. 1, a digital jukebox network is illustrated, by example, as including a jukebox network server 10 having a host processor which communicates via HTTP or other data transmission formats through a wireless communication system, such as the Internet 12, hardline, etc., to at least one or a plurality of digital audio-visual playback devices, such as digital jukeboxes 14. The communication format to each jukebox 14 can be via any transmission protocol, such as ADSL, cable modem, WCDMA, UMTS, or LMDS or other data communication protocols.

According to this aspect, a mobile communication device or user interface, typically a mobile wireless communication device, such as a cellular telephone 16, a PDA 18, or a computer 20, as non-limiting examples only, communicates with the communication network 22. The communication link or network 22 may be any type of communication provider either wireless or not, such as, but not limited to, WiFi, Internet, direct cable connection, Ethernet, GSM, GPRS, UMTS, EDGE, Token ring etc. Such a network 22 may have as a subset, a Short Message Service Center (SMSC) adapted for short text messaging, an Internet protocol having displayable drop down menus allowing user input selections, or a multimedia service (MMS) providing audio and graphic data.

Although the following example of a wireless content request pertains to a short message service using an SMSC subset of the wireless carrier network 22, it will be understood that similar data input protocols or media selection, such as through drop down menus, may also be employed.

An appropriate SMS address, such as "1414" for example, is entered by the user through the communication device 16, 18, or 20 to identify the MMM 24 service. Text messages formed of UNICODE or ASCII characters are then input by a user through the user interface 16, 18, or 20 to identify the digital media selection and other related play features, such as premium play, immediate play, etc. For example, a text message of "S AB123" can be input by a user through the communication device 16, 18 or 20. The first character, labels "S", by example only, is the type of media content. By example only "S" identifies a song. "V" would identify a video. "PS" would identify a priority play of a selected song. "PV" would identify a priority play of a video. The characters "AB" identify the location of the local jukebox 14. The alphanumeric characters "123" identify a particular media selection, such as a particular song. This information is obtainable from a list provided to the user at the local jukebox 14 venue.

These signals are transmitted to the SMSC where the user ID is validated. The location of the digital playback device or jukebox 14, media selection, and play feature data are transmitted from the SMSC to the MMM 24 by hard wire and/or wireless communication. The MMM 24 receives the selection information from the SMSC and communicates with the jukebox network server 10 to determine the availability of the selected jukebox 14. When the server 10 has verified the corresponding jukebox 14 is operating and available to play the selected digital media, the MMM 24 sends a signal to the SMSC to bill the user for the SMS message including any premium play billing. The SMSC may then request a third party, such as, but not limited to, a bank, a credit card company, a mobile operator, etc., to debit the user account for the amount of the services procured. Other methods of payment may include m-wallet (mobile wallet), prepaid cards etc.

At the same time, the MMM 24 sends the user request along with play. criteria, such as a standard, recommendation or priority request, to the server 10. The server 10 then communicates via the Internet 12 to the selected jukebox 14 to implement the digital media selection at any premium or standard schedule.

It will be noted that the transmission of the digital media selection signals from the server 10 to the selected jukebox 14 can also include the entire selected digital media, or simply a signal to the jukebox 14 to play a particular digital media already stored in the memory of the selected venue jukebox 14.

The MMM 24 is also capable of sending a message through the SMSC to the user 16 thanking the user for making the selection. This will confirm that the selection has been implemented. At the same time, the message to the user 16 can include other messages, such as an offer to buy the selected song or video at a particular price or the ability to purchase or download as wall paper to the user 16 pictures of the artist performing the selected song or performing in the selected video.

Figure 2:
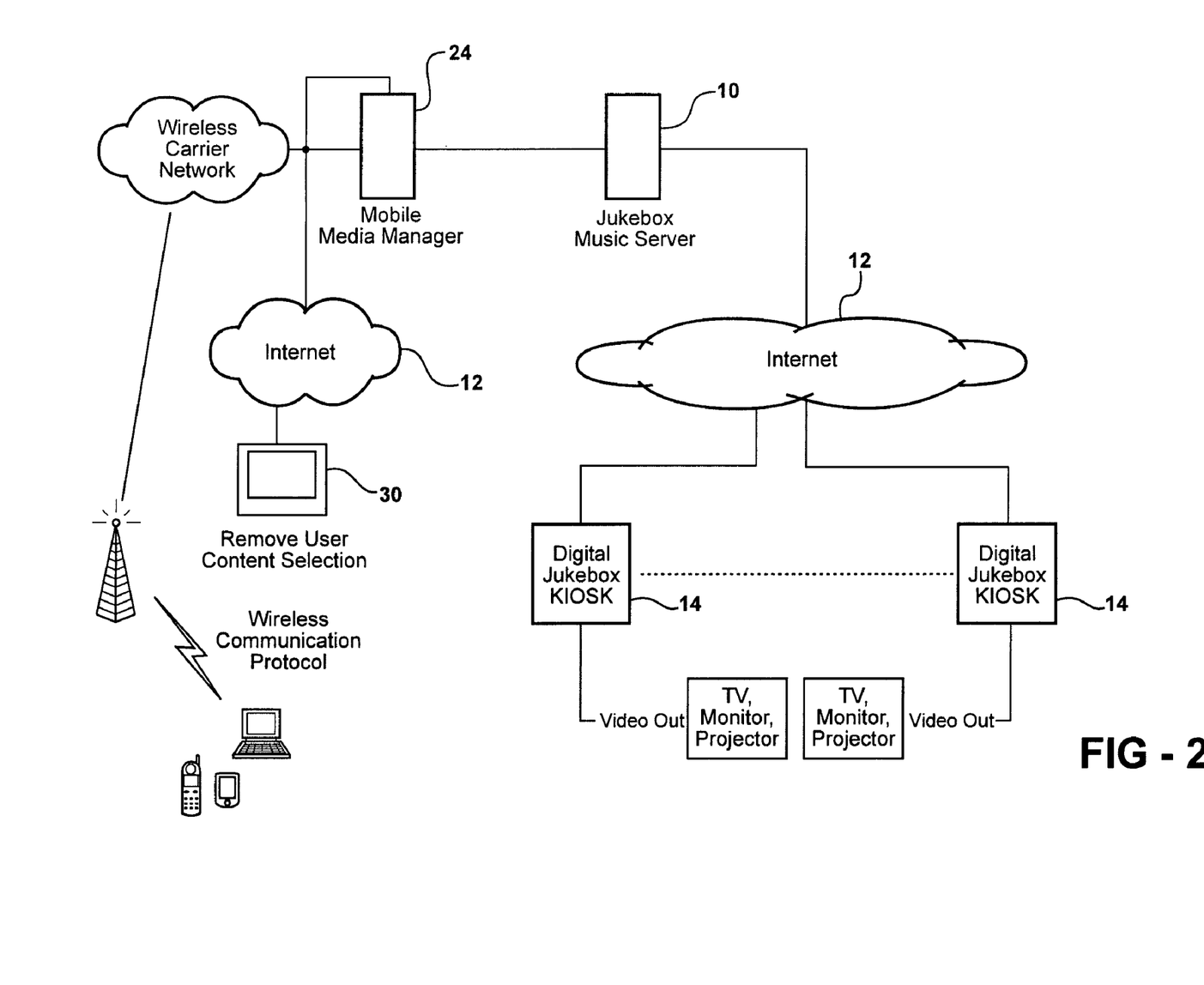

Referring now to FIG. 2, there is depicted another aspect of the apparatus shown in FIG. 1. In this aspect, a remote user content selection processor 30 can communicate through a global communication network, such as the Internet 12, to the mobile media manager 24. This enables a remote user to send dedications, digital media selections, etc., for the benefit of other users located in the proximity of a specific playback device or jukebox 14.

Figure 3:
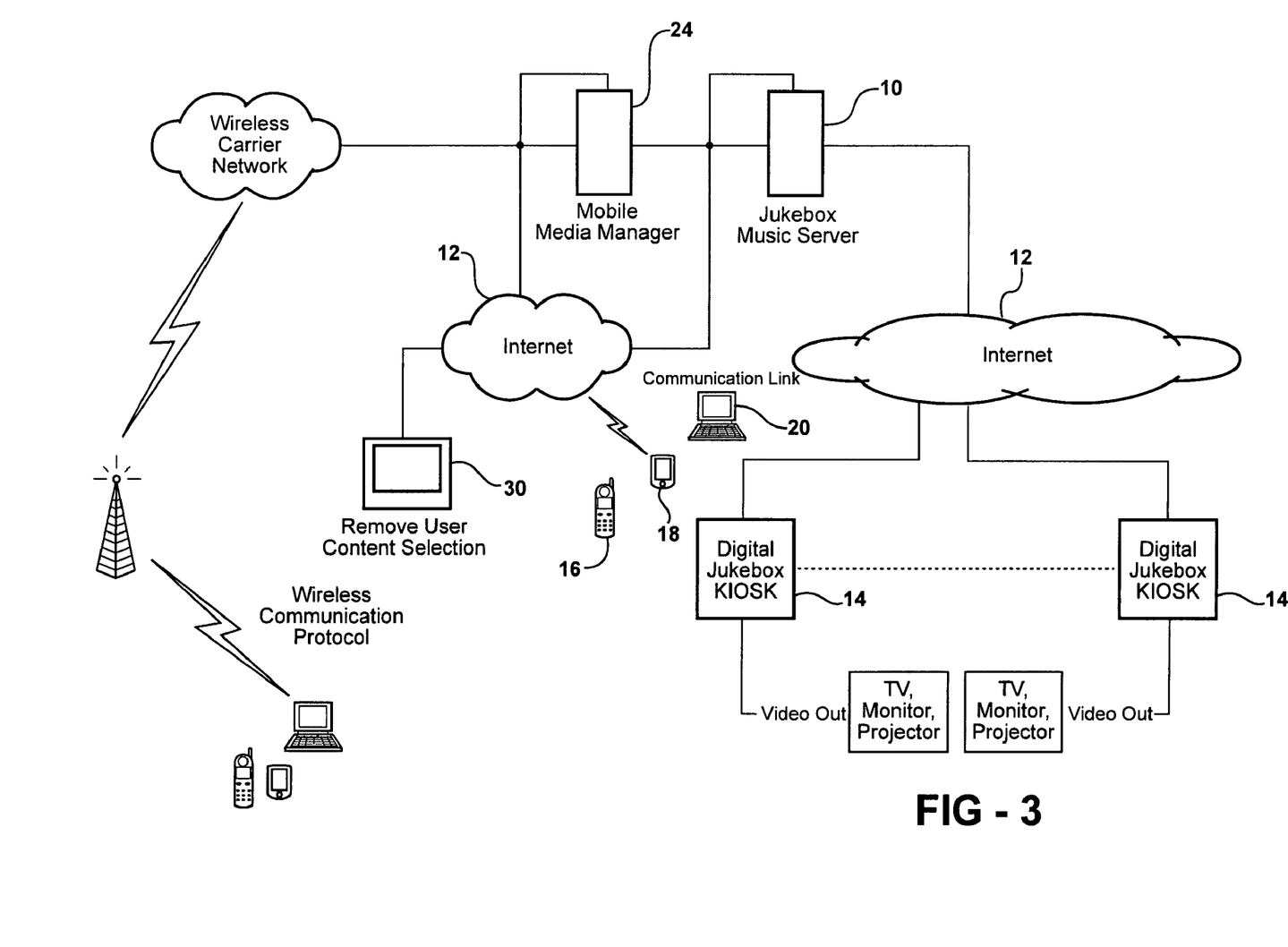

As shown in FIG. 3, the remote user content selector 30 is further modified to provide communication through the Internet 12 to either or both of the mobile media manager 24 and the music server 10. Wireless communication devices 16, 18, 20, etc., may also communicate through the Internet 12 to either or both of the mobile media manager 24 or the music server 10 to provide digital media content selection and playback for other users located in the proximity of a selected jukebox 14.

Figure 4:
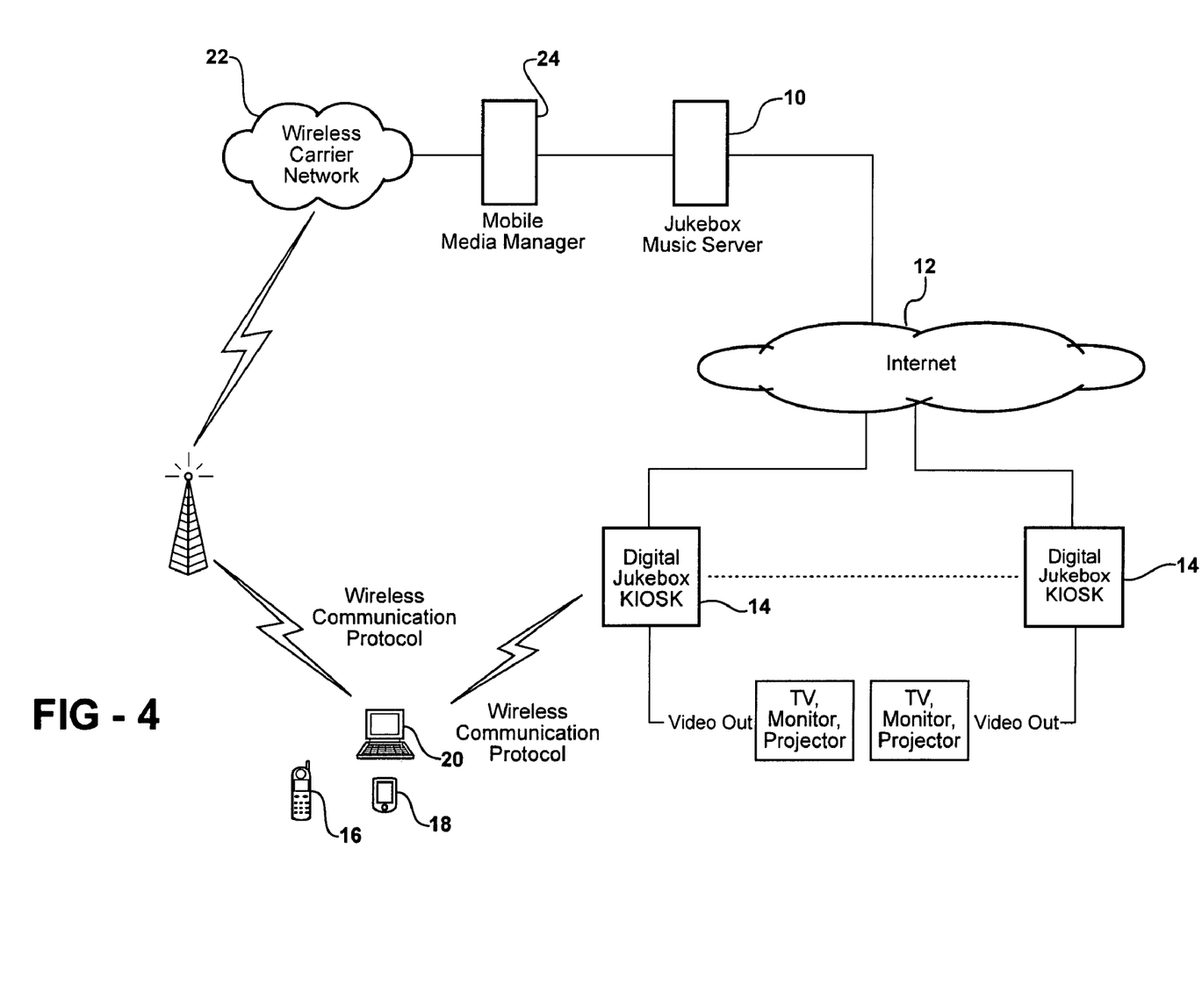

In the aspect shown in FIG. 4, the remote user interface devices 16, 18, or 20 can wirelessly communicate directly with a jukebox 14, using Bluetooth, WiFi, infrared, radio frequency signal, light signal, laser, etc., within communication signal range of the user interface devices 16, 18, or 20. The user interface device 16, 18, or 20 may request an update to the digital media content catalog from the jukebox 14. The jukebox 14 requests the catalog from the jukebox music network server 10 and forwards it to the specific user interface device 16, 18, or 20. If communication with the jukebox network server 10 fails for any reason, the jukebox 14 forwards its own digital media content catalog to the user interface device 16, 18, or 20.

In use, the user selects a specific digital media for playback. The user's interface device 16, 18, or 20 forwards the digital media content request to a jukebox 14 in its vicinity. If there is not a jukebox identification or "ID" in the user request, then it is assumed that the target jukebox 14 for playback is the jukebox 14 that received the user request.

The jukebox 14 then contacts the MMM 24 in order to validate the user. If successful, the jukebox 14 attempts to honor the user request to play the selected content. If playback is successful, the jukebox 14 communicates to the MMM 24 via the jukebox network music server 10 to indicate that the user needs to be billed and informs the user about the selection completion. If there is any error during this process, the jukebox 14 notifies the user directly of the error.

If there is a jukebox ID in the request (different from the one that received the digital media content request), then this request is forwarded to the MMM 24 which acts on it as if it had received the request from any other source. The selected digital media is then output from the jukebox 14 from a media storage in the jukebox 14 or via a download from the Internet 12 and the jukebox music server 10.

Figure 5:
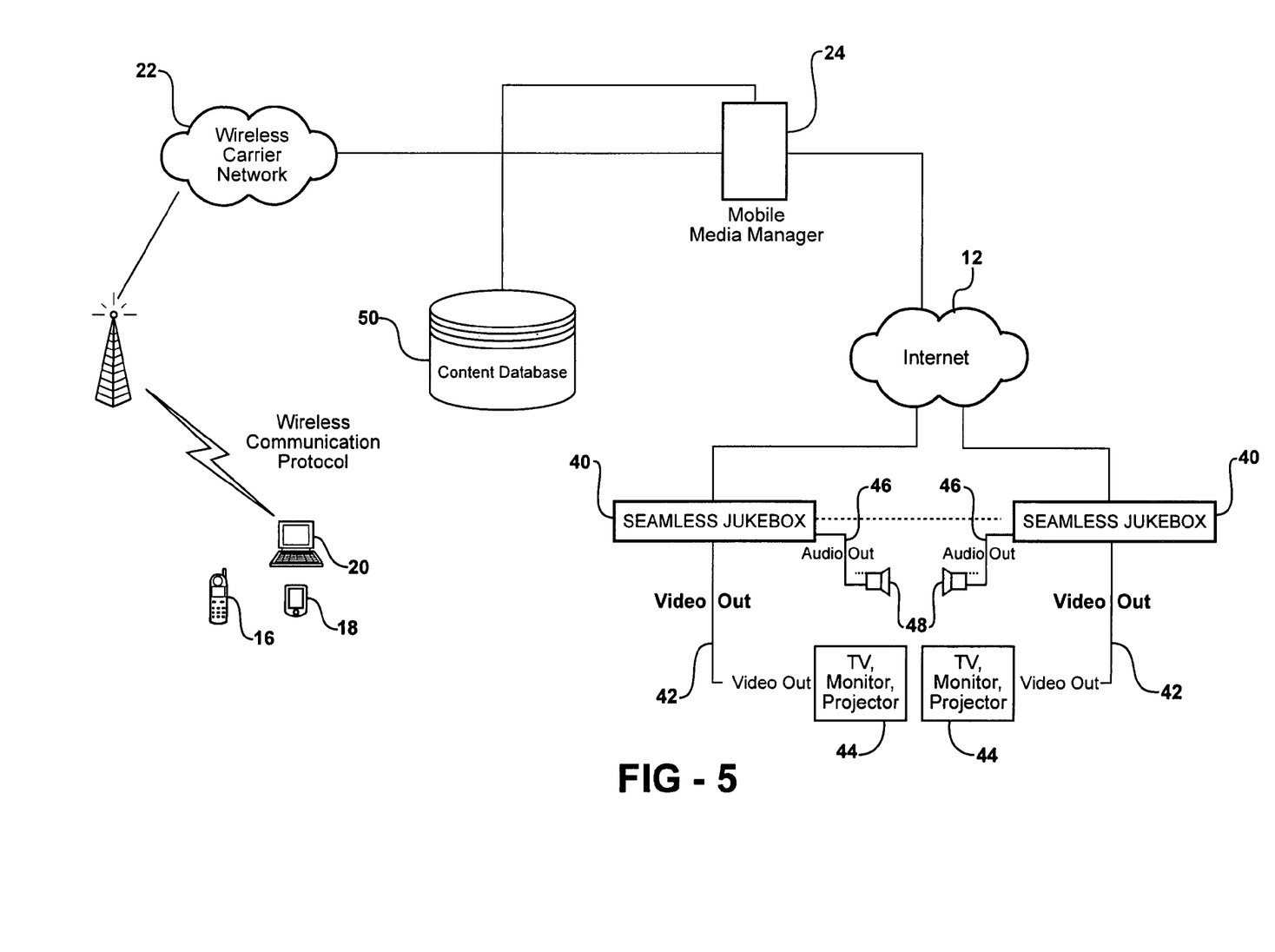

In another aspect, a seamless digital audio-visual apparatus or "seamless" jukebox 40 is provided in one or more locations. Some or all of the seamless jukeboxes 40 may include a video output feed 42 to a video display device, such as a TV, monitor, or projector 44. An audio output 46 may also supplied from each seamless jukebox 40 to an audio output playback device, such as one or more speakers 48.

The audio-visual apparatus or seamless jukebox 40 simply comprises a music server coupled to the Internet 12 and an audio or video output device 48 or 46, respectively, which is capable of generating audio sounds and/or visual images as in Internet download.

In this aspect, there is no physical jukebox 14 within communication range of the user.

In this aspect, the digital media content is stored in a memory storage or database 50 and accessed by the mobile media manager (MMM) 24 in response to a user request transmitted through the carrier network 22 to the MMM 24. The selected digital media or content is then transmitted by the MMM 24 through the global communication network or Internet 12 to the specified jukebox 40 for output to the user.

The user can browse the digital media content catalog only through the MMM 24. This aspect eliminates the requirement to have a physical jukebox in a particular location along with the associated touch screen, keyboard, track ball, mouse, etc. Once the physical jukebox 14 is removed from a particular location, the need to handle currency or money for each selection is also eliminated thereby simplifying and automating the digital media content selection process.

Figure 6:
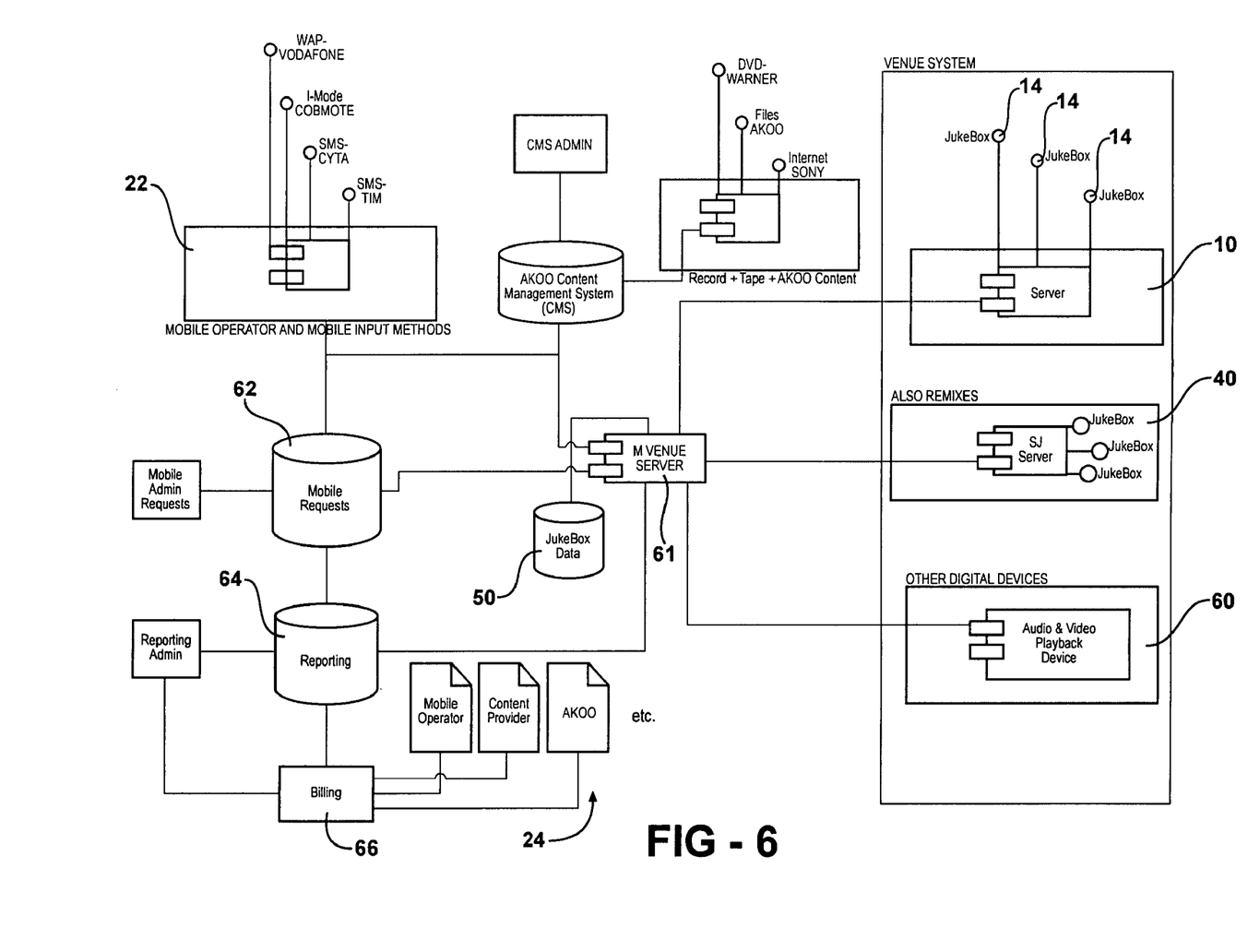
FIG. 6 is a detailed block diagram of the apparatus shown in any of FIGS. 1-5.
Figure 7:
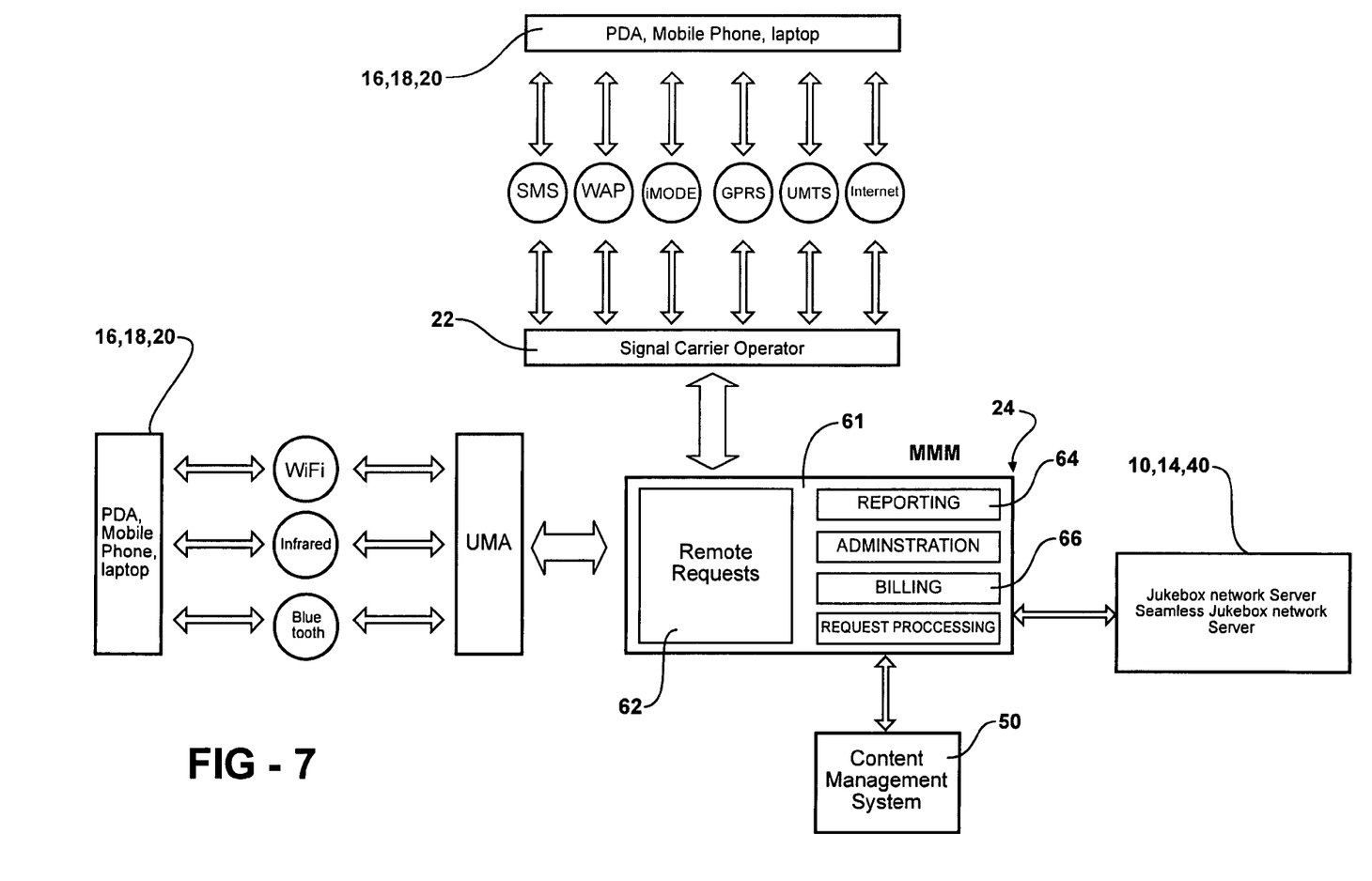
FIG. 7 is a detailed block diagram of the mobile manager shown in FIGS. 1-5.

FIGS. 6 and 7 depict a block diagrams of the major components of the control means or mobile media manager 24 used with any of the different aspects shown in FIGS. 1-5. The MMM 24 includes a so-called m-Venue server 61 which communicates with the music server 10, any of the seamless jukeboxes 40 as well as other audio and video playback devices 60.

FIG. 7 also depicts the transmission or communication of digital media selection signals from the user interfaces or devices 16, 18, and 20 through the signal carrier network 22 as described above in conjunction with FIG. 1, through the Internet 12 as shown in conjunction with FIG. 3 or directly to a digital jukebox 14 or 40 as shown in FIG. 4 or 5. The MMM 24, as described above, can receive a remote content or digital media selection signal from any source. The MMM 24 then checks the selection for validity, processes it, stores it in a database, and forwards the request to the network server 10 in the aspect shown in FIG. 1 or directly to the jukebox 14 in other aspects.

The server 10 or jukebox 14, 40, receives the signal from the MMM 24 and tries to the place the request to the jukebox 14, 40, etc. If this is successful, the server 10 then replies with a success message to the waiting MMM 24. If for any reason there is a failure in the request process, such as the jukebox 14 not responding, the transmission network is down, etc., the server 10 replies to the MMM 24 with a failure message along with the reason of the failure. Once the MMM 24 has received an answer to the remote content selection signal, the MMM 24 records the answer in the database and informs the user with the result of his request.

A user request from any of the mobile user interface devices 16, 18, and 20 is communicated through the network 22 to a mobile request control means 62. The user request is then communicated to the m-Venue server 61 for digital content selection at a specific digital audio-visual playback device or jukebox 14, 40, etc., or in the jukebox music server 10 which transmits the digital media selection to the individual jukeboxes 14, 40, etc., or from the content database 50 which is then transmitted by the MMM 24 directly to the jukeboxes 14, 40, etc.

Each user request is also forwarded to a reporting module 64 which is in communication with the m-Venue server 61 to record each user request and the validation of a successful digital selection. The reporting module 64 communicates with a billing module 66 which suggests the fee for each user request.

What is claimed is:

1. A method for content selection of digital media stored in a memory coupled to a digital media processor and playable on a digital audio-visual playback device comprising the steps of:

providing a first communication link between a user interface and a media management control including a processor wherein the media management control is distinct from the digital media processor;

providing a second communication link between the media management control and a digital media processor coupled to a memory for storing and retrieving digital media, the digital media processor coupled in communication with at least one digital audio-visual playback device;

transmitting only a single communication message from the user interface remote from the playback device through the first communication link to processor in the media management control, the single communication message including a digital media identifier as a digital media content request, a media management access identifier and at least one digital media playback device identifier;

in response to the digital media content request from the user interface, the media management control managing the execution and the manner of execution of the digital media specified by the digital media identifier through the second communication link to the digital media processor on the at least one digital audio-visual playback device identified in the single communication message by at least the steps of:

the media management control communicating with the digital media processor to determine the availability of the playback device specified in the digital media content request from a user interface;

determining the availability of the requested digital media at the location of the playback device by the media management control at the time of the user request;

determining by the media management control the operability of the at least one identified playback device to play the requested media;

notifying the user via the user interface by the media management control of the acceptance/rejection of the digital media content request; and initiating transmission of the selected digital media by the digital media processor to the at least one identified digital audio-visual playback device for play of the selected digital media by the at least one identified digital audio-visual playback device.

2. The method of claim 1 wherein the step of transmitting the digital media content request through the first communication link further comprises:

forming the first communication link to include at least a wireless communication portion.

3. The method of claim 1 wherein the step of transmitting the digital media content request through the first communication link further comprises:

forming at least a portion of the first communication link to include the Internet.

4. The method of claim 1 further comprising the steps of:

generating by the media management control identified digital media content request signals from a digital media content request to access the identified digital media content in the memory.

5. The method of claim 1 wherein the step of initiating the transmission of the identified digital media content request comprises the step of:

communicating the digital media content to a digital audio-visual playback device.

6. The method of claim 5 wherein the step of communicating the identified digital media to the digital audio-visual playback device further comprises the step of:

transmitting the identified digital media over the Internet to the digital audio-visual playback device.

7. The method of claim 1 further comprising the step of:

media management control transmitting data relating to the digital media content request and the play of the selected digital media by the playback device to the user interface.

8. The method of claim 1 further comprising the step of:

the media management control polling the digital media processor for an updated list of available playback devices and available digital media, in response to a digital media content request from a user interface.

9. The method of claim 1 wherein the step of managing the execution and the manner of execution of the digital media further comprises of the steps of:

notifying the user of an acceptance of the request; and processing billing for the request to the user.

10. The method of claim 1 further comprising the step of:

allowing selection of a standard play in the time order of user requests received by the media management control and a premium play advanced out of time order of user requests received by the media management control.

11. The method of claim 1 further comprising the steps of:

providing a distinct identifier for at least one of the digital media processor and the at least one digital audio-visual playback device coupled to the digital media processor; and including one location identifier in the user request through the first communication link.

12. An apparatus for content selection for play by a digital audio-visual playback device comprising:

digital media processor means for storing and retrieving digital media in a memory;

means for transmitting a digital media content request from a user interface in only a single communication message through a first communication link to a media management control, wherein the media management control is distinct from the digital media processor, the request including, in the single communication message, at least a location identifier of at least one of the digital media processor and the at least one playback device, and a digital media access identifier;

the media management control communicating with the digital media processor to determine the availability of the playback device specified in the digital media content request from a user interface;

means for providing a second communication link between the media management control and a digital media processor coupled to a memory containing digital media, the digital media processor in communication with at least one digital audio-visual playback device, the media management control, in response to a digital media content request through the first communication link from a user interface remote from an at least one digital audio-visual playback device, managing the execution and the manner of execution of the digital media specified by the digital media identifier through the digital media processor on the at least one digital audio-visual playback device by at least:

means for determining the availability of the requested digital media at the location of the at least one playback device by the media management control at the time of the user request; and means for determining the operability of the at least playback device to play the requested digital media;

means for initiating the transmission of the identified digital media from the digital media processor to the at least one digital audio-visual playback device for play of the identified digital media by the at least one digital audio-visual playback device; and means for notifying the user via the user interface by the media management control of the acceptance/rejection of the digital media content request.

13. An apparatus for digital media content selection comprising:

at least one digital audio-visual playback device capable of playing digital audio-visual media, the playback device having a distinct location identifier;

a digital media processor having discrete digital audio-visual media stored in a memory the digital media processor coupled to the at least one playback device;

a user interface, separate from the digital audio-visual playback device, the user interface transmitting a digital media request identifying a digital audio-visual media content, the request including, in only a single communication message, at least a digital media access identifier;

a first communication link coupling the user interface and a media management control; wherein the media management control is distinct from the digital media processor;

the media management control coupled in data communication with the digital media processor by a second communication link and managing the execution of the digital media specified by the digital media identifier through the digital media processor and the digital audio-visual playback device by;

the media management control communicating with the digital media processor to determine the availability of the playback device specified in the digital media content request from a user interface;

means for determining the availability of the requested digital media by the at least one playback device by the media management control at the time of the user request;

means for determining the operability of the at least one playback device to play the user request by the media management control in response to user request parameters;

means for controlling the order of play of digital media content requests from a plurality of distinct users by service priority queuing; and a transmission link coupling the digital media processor and the digital audio-visual playback device for transmitting signals relating to selected digital audio-visual media content to the digital audio-visual playback device for play of the selected digital media.

14. The apparatus of claim 13 wherein:
the media management control coupled to the transmission link.

15. The apparatus of claim 14 wherein the digital media processor comprises:
a jukebox server coupled to the transmission link.

16. The apparatus of claim 13 wherein:
at least a portion of the first communication link includes a wireless carrier network.

17. The apparatus of claim 13 wherein the transmission link comprises:
at least one of the Internet and a wireless communication protocol.

18. The apparatus of claim 13 further comprising:
billing means, operative by the media management control, for billing a user for a digital media request.

19. The apparatus of claim 13 further comprising:
means, communicating with the user interface, for providing the user with a means for selecting the location of one specific digital audio-visual playback device.

20. The apparatus of claim 13 wherein the first communication link and the media management control are adapted for SMS communication.

21. The apparatus of claim 13 further comprising:
media management control transmitting data relating to the digital media content request and the play of the selected digital media by the playback device to the user interface.

22. In a digital audio-visual media playback apparatus including at least one digital audio-visual playback device capable of generating audio-visual media from a memory containing discrete digital media, the improvement comprising:

digital media processor means for storing and retrieving digital media in a memory;

a first communication link between a user interface and a media management control wherein the media management control is distinct from the digital media processor;

a second communication link between the media management control and the digital media playback apparatus;

a distinct identifier assigned to at least one of a media playback device and a digital media;

a user interface, separate from the digital audio-visual playback device, the user interface transmitting a digital media request, in a single communication method, including at least one identifier of at least one playback device and a digital media selection to be played by the at least one identified digital audio-visual playback device in a manner capable of being perceived by the user;

the digital media content request from the user interface transmitted through a first communication link to a media management control;

the media management control coupled to the digital media play back apparatus by the second communication link and controlling the execution and the manner of execution of the digital media on the at least one playback device through the second communication link by;

the media management control communicating with the digital media processor to determine the availability of the playback device specified in the digital media content request from a user interface;

determining the availability of the requested digital media at the location of the at least one playback device by the media management control at the time of the user request; and determining the operability of the at least one playback device to play the requested digital media content.

23. The method of claim 22 further comprising the step of:
media management control transmitting data relating to the digital media content request and the play of the selected digital media by the playback device to the user interface.

24. A method for content selection of digital media comprising the steps of:

providing a separate first communication link between each of a plurality of user interfaces and a single media management control;

providing a second communication link between the media management control and a digital media processor coupled to a memory for storing and retrieving digital media, wherein the media management control is distinct from the digital medial processor, the digital media processor coupled in communication with at least one digital audio-visual playback device;

transmitting only a single communication message from each user interface remote from the playback device through one of the first communication links to a processor in the media management control, the single communication message including at least a digital media identifier as a digital media content request, a media management access identifier and at least one digital media playback device identifier;

in response to the digital media content request from the user interface, the media management control managing the execution and the manner of execution of the digital media specified by the digital media identifier through the second communication link to the digital media processor on the at least one digital audio-visual playback device identified by the single communication message by at least the steps of:

the media management control communicating with the digital media processor to determine the availability of the playback device specified in the digital media content request from a user interface;

determining the availability of the requested digital media at the location of the playback device by the media management control at the time of the user request;

determining by the media management control the operability of the at least one identified playback device to play the requested digital media;

notifying the user via the user interface by the media management control of the acceptance/rejection of the digital media content request; and initiating transmission of the selected digital media by the digital media processor to the at least one identified digital audio-visual playback device for play of the selected digital media by the at least one identified digital audio-visual playback device.

25. An apparatus for content selection for play by a digital audio-visual playback device coupled to a digital media processor means for storing and retrieving digital media in a memory comprising:

digital media processor means for storing and retrieving digital media in a memory;

means for transmitting a digital media content request from a user interface in only a single communication message through a first communication link to a media management control, wherein the media management control is distinct from the digital media processor, the request including, in the single communication message, at least a location identifier of at least one of the digital media processor and the at least one playback device, and a digital media access identifier;

means for providing a second communication link between the media management control and a digital media processor coupled to a memory containing digital media, the digital media processor in communication with at least one digital audio-visual playback device, the media management control, in response to a digital media content request through the first communication link from a user interface remote from an at least one digital audio-visual playback device, managing the execution and the manner of execution of the digital media specified by the digital media identifier through the digital media processor on the at least one digital audio-visual playback device by at least;

the media management control communicating with the digital media processor to determine the availability of the playback device specified in the digital media content request from a user interface;

means for determining the availability of the requested digital media at the location of the at least one playback device by the media management control at the time of the user request;

means for determining the operability of the at least playback device to play the requested digital media;

means for initiating the transmission of the identified digital media from the digital media processor to the at least one digital audio-visual playback device for play of the identified digital media by the at least one digital audio-visual playback device; and means for notifying the user via the user interface by the media management control of the acceptance/rejection of the digital media content request.

* * * * *